United States Patent
Chou et al.

(10) Patent No.: US 8,717,893 B2
(45) Date of Patent: May 6, 2014

(54) NETWORK STABILIZER

(75) Inventors: Koutoung Chou, Plano, TX (US);
Joecylyn Malit, Frisco, TX (US);
Shengping Shiau, Plano, TX (US);
Zhongping Pan, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 309 days.

(21) Appl. No.: 12/955,062

(22) Filed: Nov. 29, 2010

(65) Prior Publication Data

US 2012/0134260 A1 May 31, 2012

(51) Int. Cl.
*H04L 12/28* (2006.01)

(52) U.S. Cl.
USPC ........................................ 370/235

(58) Field of Classification Search
USPC ......... 370/235, 397, 248, 225, 229, 232, 237, 370/241, 244, 245, 252
See application file for complete search history.

(56) References Cited

U.S. PATENT DOCUMENTS

| | | | | |
|---|---|---|---|---|
| 7,307,954 B1 * | 12/2007 | Strandberg et al. | ........... | 370/235 |
| 7,764,704 B2 * | 7/2010 | Tzeng et al. | ................... | 370/412 |
| 2006/0072474 A1 * | 4/2006 | Mitchell | ....................... | 370/252 |
| 2006/0155532 A1 * | 7/2006 | Nam et al. | ..................... | 704/222 |
| 2006/0215550 A1 * | 9/2006 | Malhotra | ....................... | 370/229 |
| 2006/0250961 A1 * | 11/2006 | Vasseur | ......................... | 370/235 |
| 2007/0019558 A1 * | 1/2007 | Vasseur et al. | ................ | 370/248 |
| 2007/0237160 A1 * | 10/2007 | Natarajan et al. | ............. | 370/397 |
| 2009/0041032 A1 * | 2/2009 | Dong et al. | ................... | 370/400 |
| 2009/0161684 A1 * | 6/2009 | Voruganti et al. | ............. | 370/412 |
| 2009/0196194 A1 * | 8/2009 | Paloheimo et al. | ............ | 370/252 |
| 2010/0020686 A1 * | 1/2010 | Lee et al. | ...................... | 370/231 |
| 2011/0141891 A1 * | 6/2011 | So | ................. | 370/235 |
| 2011/0176554 A1 * | 7/2011 | Yamada et al. | ............... | 370/412 |

* cited by examiner

*Primary Examiner* — Anh-Vu Ly
*Assistant Examiner* — Gustavo Lopez-Vargas (57) ABSTRACT

A network device determines that an outgoing network-to-network interface has dropped one or more network control packets and incrementally adjusts, based on the determining, a drop threshold parameter for the network control packets to give preference to the network control packets over non-network control packets. After the adjusting, the network device monitors traffic over the interface, and preempts, based on the monitoring, a low-priority label switched path (LSP) using the interface when the interface reaches a congested threshold or when the interface has dropped one or more other network control packets. The network device restores the low-priority LSP to the interface when the interface has reached an uncongested threshold.

20 Claims, 10 Drawing Sheets

NETWORK STABILIZER

BACKGROUND

Quality of service (QoS) refers to a set of techniques to manage the available resources of a network. It is achieved by managing delay, delay variation (jitter), bandwidth, and packet loss (i.e. "service") parameters of a network. There are various QoS architectures available today but the simplest and most utilized is the DiffServ (differentiated services) model. This model utilizes a Differentiated Services Code Point (DSCP) in a Type of Service (ToS) byte of an Internet protocol (IP) header so that a packet can be classified and forwarded to achieve its required service parameters. The DiffServ model is applied at boundaries (e.g., interfaces) between network nodes (e.g., routers, switches, etc.).

How a packet is serviced in a network can vary between network nodes. The variation may be due to implementation differences or just due to hardware limitations. In most cases, the differences in how packets are serviced are small but these differences may be a factor between a stable, trouble-free network or a network that is constantly changing (e.g., route flapping and re-routing). Consider, for example, the scenario where a routing protocol's signaling (e.g., network control, or NC, packets) is treated differently between nodes in the network. One node may treat a NC packet as a high-priority packet while a downstream node may treat the NC packet as only a best-effort (e.g., lower priority) packet. Instead of dropping other (e.g., non-NC) packets first, the downstream node drops the NC packet first, which can result in route flapping. The route flapping, in turn, may cause either a re-route or a complete service outage depending on the availability of a redundant path.

The DiffServ model can be utilized so a packet can achieve its required latency, jitter, and bandwidth restrictions. A node employing the DiffServ model can forward higher priority traffic first before forwarding lower priority traffic. However, sometimes, higher and lower priority packets (e.g., NC packets and non-NC packets) are intermingled and can end up sharing the same resources (e.g., a node interface). Even though critical packets may get forwarded under most conditions, there may be other conditions (e.g., heavy congestion) where giving preference or priority to a type of packet is not sufficient protection.

DETAILED DESCRIPTION OF PREFERRED EMBODIMENTS

The following detailed description refers to the accompanying drawings. The same reference numbers in different drawings may identify the same or similar elements.

Systems and/or methods described herein may monitor traffic statistics for an interface of a network node to determine if the interface is congested and/or is dropping "critical" packets. The systems and/or methods may take proactive steps to adjust drop parameters for critical packets and/or re-route lower priority label switched paths (LSPs) to avoid network instability caused by, for example, service limitations in other network nodes. In one implementation, critical packets may include network control (NC) packets or other protocol signaling packets. In other implementations, a critical packet may include another type of packet that can be classified and forwarded using its DSCP value, such as voice packets and/or video packets.

In one example implementation, the systems and/or methods may determine that an outgoing network-to-network interface (NNI) has dropped one or more network control packets and incrementally adjust, based on the determining, a drop threshold parameter for the network control packets to give preference to the network control packets over non-network control packets. After the adjusting, the systems and/or methods may also monitor traffic over the interface, and preempt, based on the monitoring, a low-priority LSP using the interface when the interface reaches a congested threshold (e.g., a configurable percentage of a total available buffer capacity for the interface) or when the interface has dropped one or more other network control packets. The systems and/or methods may restore the low-priority LSP to the interface when the interface has reached an uncongested threshold (e.g., a lower configurable percentage of the total available buffer capacity for the interface).

The term "packet," as used herein, may refer to a packet, a datagram, or a data item; a fragment of a packet, a fragment of a datagram, or a fragment of a data item; or another type, arrangement, or packaging of data. The term "stream," as used herein, may refer to a flow of packets to an interface, channel, or port. The term "port," as used herein, may refer to a physical interface.

Figure 1:
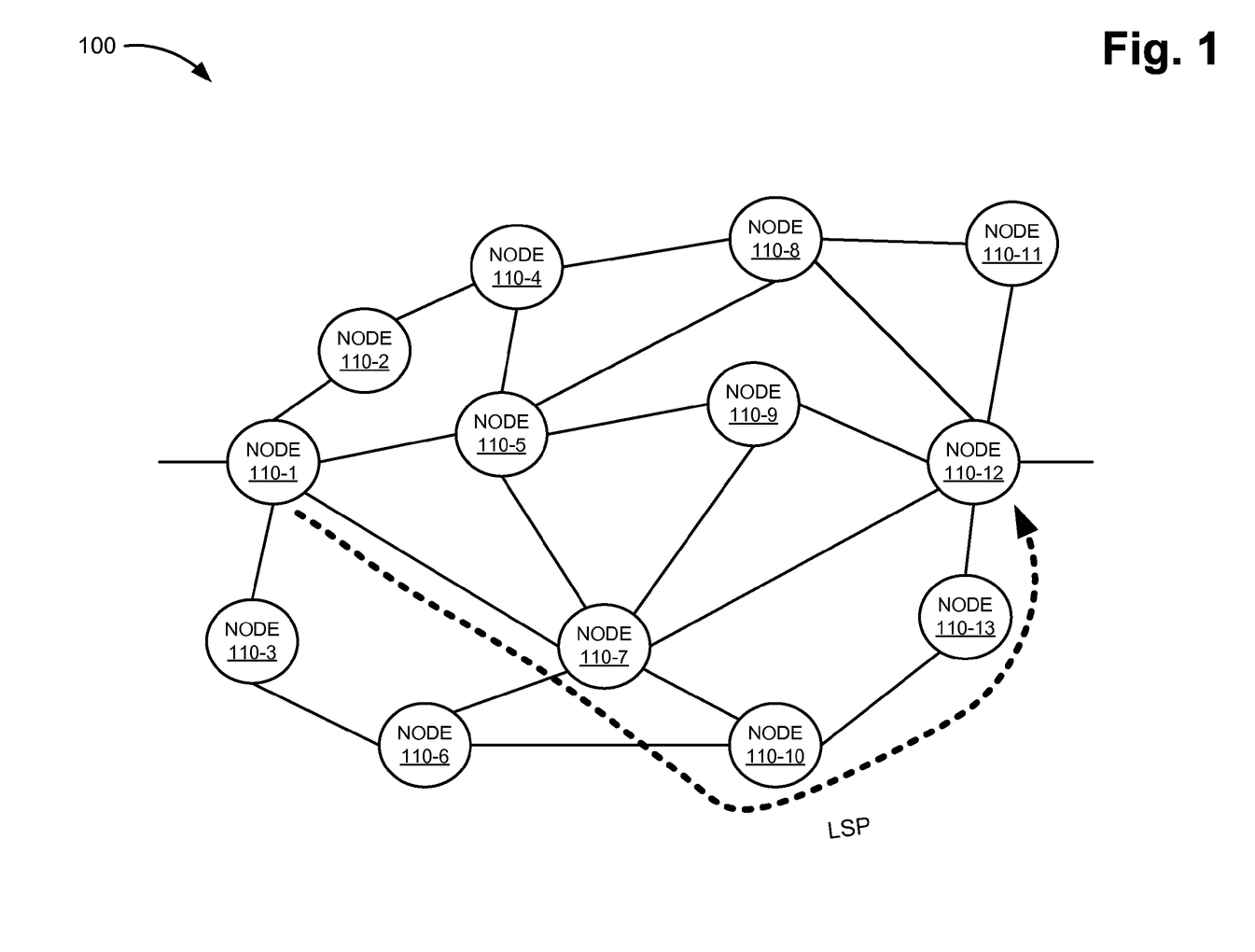
FIG. 1 is a diagram of an example network in which systems and/or methods described herein may be implemented.

FIG. 1 is a diagram of an example network 100 in which systems and/or methods, described herein, may be implemented. As shown in FIG. 1, network 100 may include nodes 110-1, 110-2, . . . , 110-13 (referred to collectively as "nodes 110," and individually as "node 110"). Nodes 110 may connect via a number of network links. The network links may be wired or wireless links. Each node 110 may connect to one or more other nodes 110.

Node 110 may include a device that transmits and/or receives data traffic. Node 110 may take the form of a routing device, a switching device, a multiplexing device, or a device that performs routing, switching, and/or multiplexing functions. In one implementation, node 110 may be a digital device. In another implementation, node 110 may be an optical device. In yet another implementation, node 110 may be a combination of a digital device and an optical device.

Nodes 110 may be connected via digital channels (e.g., time-division multiplexing (TDM) channels) or optical channels (e.g., wave division multiplexed channels) and may collectively form a multiprotocol label switching (MPLS) network. Nodes 110 may assign labels to packets and make forwarding decisions based on these labels. For example, a node 110 may add a MPLS header to a packet and include, in the MPLS header, one or more labels that are used to label switch the packet across network 100.

A path, called a LSP, may be set up through a set of nodes 110 in network 100. Typically, a LSP is unidirectional and carries packets from an ingress node (sometimes referred to as a "label edge router") to an egress node (sometimes also referred to as a "label edge router") via one or more intermediate nodes (sometimes referred to as "label switch routers"). The ingress node may push a label onto a packet. An intermediate node may perform a lookup operation based on the label and route the packet based on a result of the lookup operation. The intermediate node may also perform other operations based on the label, such as swap the label with another label, push a label (e.g., add another label to the packet), or pop the label (e.g., remove the label from the packet). The egress node may pop the label off the packet before forwarding the packet towards the packet's destination. For the LSP shown in FIG. 1, node 110-1 may correspond to the ingress node, nodes 110-7, 110-10, and 110-13 may correspond to intermediate nodes, and node 110-12 may correspond to the egress node of a LSP.

Multiple LSPs may be set up in network 110. Some of these LSPs may share nodes 110. In other words, a particular node 110 may be part of two or more LSPs. The functions, performed by the particular node 110, may differ for different LSPs. For example, the particular node 110 may function as an intermediate node for one LSP and as an ingress or egress node for another LSP.

While FIG. 1 shows a particular number and arrangement of nodes 110, network 100 may include additional nodes, fewer nodes, different nodes, or differently arranged nodes 110 than illustrated in FIG. 1.

Figure 2:
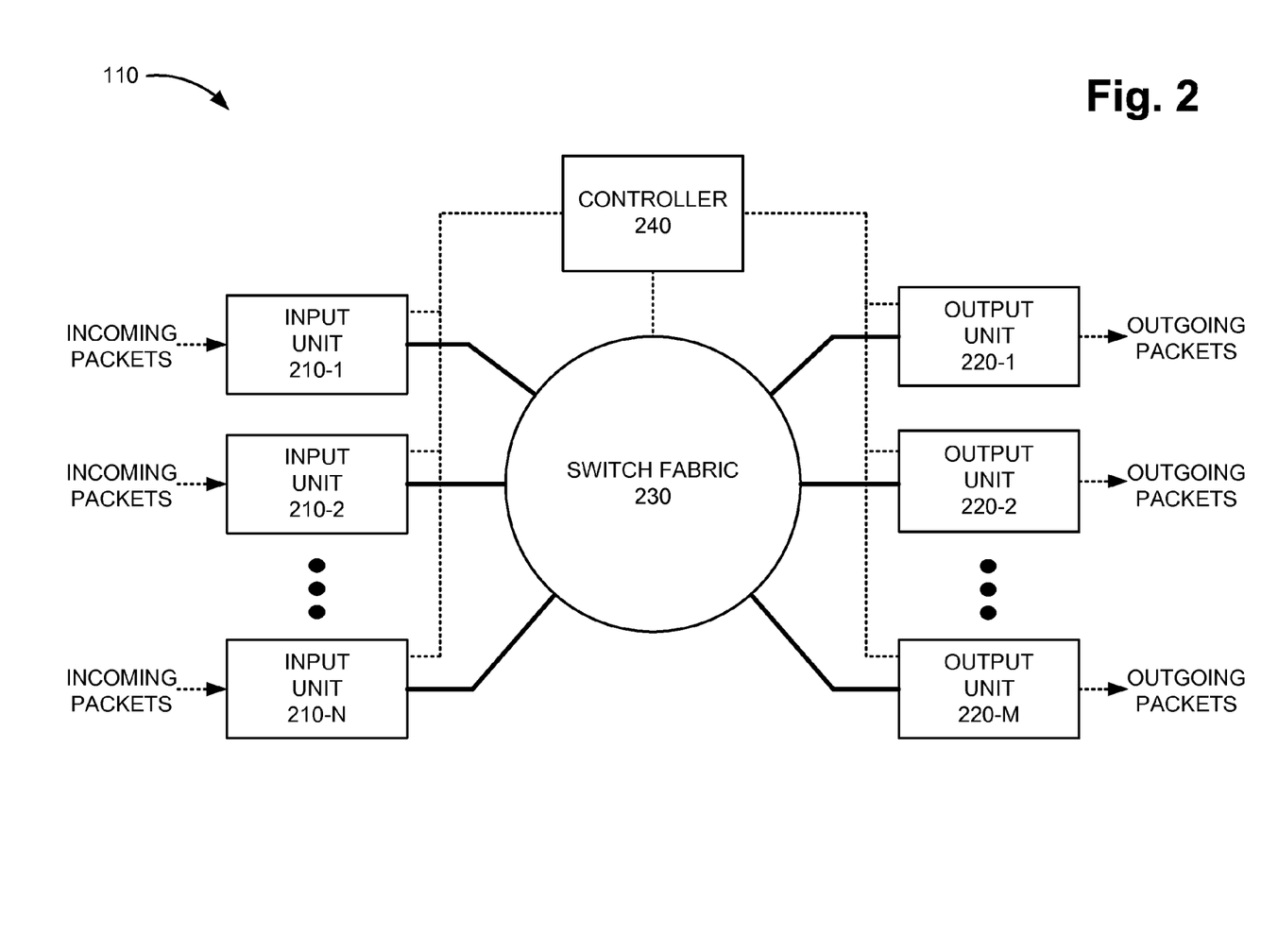
FIG. 2 is a diagram of example components of a node depicted in FIG. 1.

FIG. 2 is a diagram of example components of a node 110. As shown in FIG. 2, node 110 may include input units 210-1, 210-2, . . . , 210-N (collectively referred to as "input units 210," and individually as "input unit 210") (where N≥1), output units 220-1, 220-2, . . . , 220-M (collectively referred to as "output units 220," and individually as "output unit 220") (where M≥1), a switch fabric 230, and a controller 240.

Input unit 210 may include a component or a collection of components to process incoming packets (i.e., packets received on network links). Input unit 210 may manage a port or a collection of ports via which packets can be received. Input unit 210 may perform certain operations on incoming packets, such as decapsulation, encapsulation, demultiplexing, multiplexing, queuing, etc. operations, that may facilitate the processing and/or transporting of the incoming packets by other components of node 110.

Output unit 220 may include a component or a collection of components to process outgoing packets (i.e., packets transmitted on network links). Output unit 220 may manage a port or a collection of ports via which packets can be transmitted. Output unit 220 may perform certain operations on outgoing packets, such as encapsulation, decapsulation, multiplexing, demultiplexing, queuing, prioritizing, etc. operations, that may facilitate the processing and/or transmitting of the outgoing packets from node 110.

Switch fabric 230 may include one or more switching planes to facilitate communication among input units 210, output units 220, and/or controller 240. In one example implementation, each of the switching planes may include a single or multi-stage switch of crossbar elements. Switch fabric 230 may also, or alternatively, include processors, memories, and/or paths that permit communication among input units 210, output units 220, and/or controller 240.

Controller 240 may include one or more processors, microprocessors, application specific integrated circuits (ASICs), field programming gate arrays (FPGAs), or the like that may be optimized for networking and communications. Controller 240 may also include static memory (e.g., a read only memory (ROM)), dynamic memory (e.g., a random access memory (RAM)), cache memory, and/or flash memory for storing data and/or machine-readable instructions.

Controller 240 may also communicate with other nodes 110 to exchange information regarding network topology and labels to facilitate the label switching of packets. Controller 240 may perform MPLS functions for node 110, such as label lookups, label popping, swapping, and/or pushing operations, routing decisions, etc. Controller 240 may also determine when network congestion exists at particular output ports and instruct one or more output units 220 to modify drop thresholds for particular (e.g., critical) packets and/or reroute particular LSPs to alleviate the congestion.

Although FIG. 2 shows example components of node 110, in other implementations, node 110 may contain fewer components, different components, differently arranged components, or additional components than depicted in FIG. 2. In still other implementations, one or more components of node 110 may perform one or more other tasks described as being performed by one or more other components of node 110.

Figure 3:
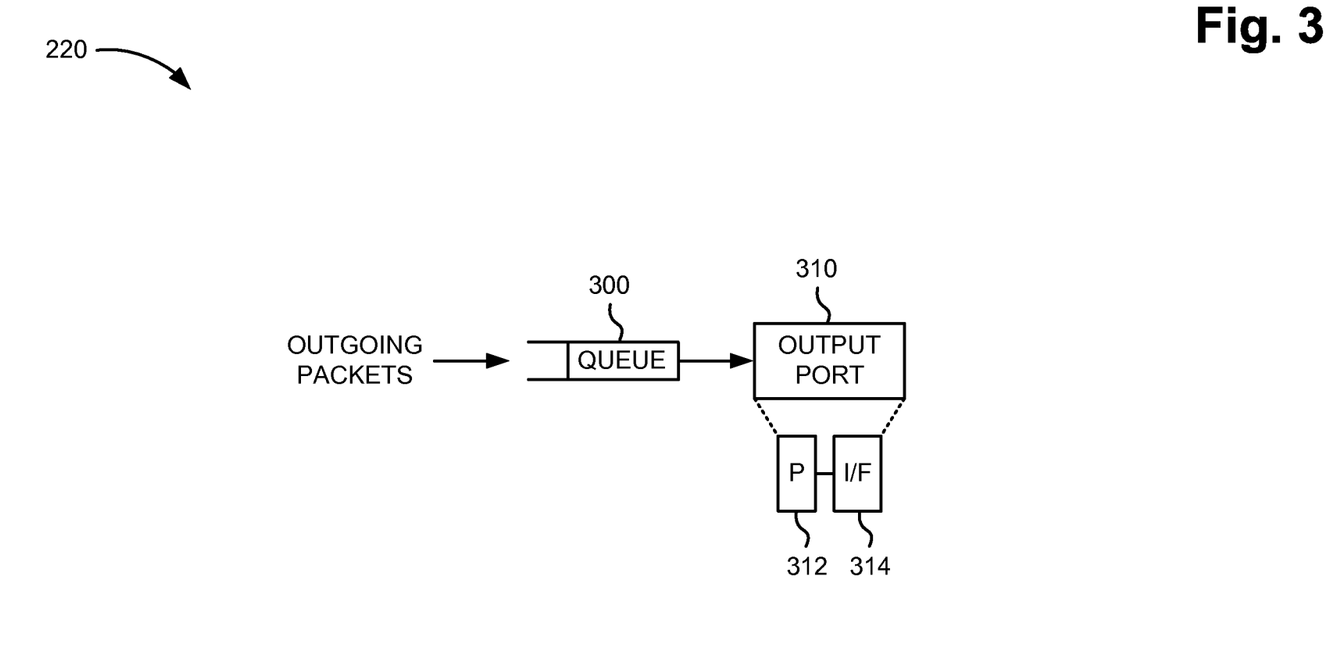
FIG. 3 is a diagram of an example implementation of a portion of an output unit of FIG. 2.

FIG. 3 is a diagram of an exemplary implementation of a portion of output unit 220. As shown in FIG. 3, output unit 220 may include a queue 300 and an output port 310.

Queue 300 may include a storage device, or a group of storage devices, that temporarily stores outgoing packets for transmission from node 210. In one implementation, queue 300 may store packets of one or more particular classes, priorities, types, traffic flows, etc. Packets, within queue 300, may be processed based on a queue management mechanism with congestion avoidance capabilities, such as weighted random early detection (WRED). A single queue 300 may have multiple thresholds (e.g., such as DSCP thresholds). Traffic congestion may be indicated when packets get dropped from queue 300. Packets may get dropped when packets are added to queue 300 at a faster rate than packets are outputted from queue 300.

Output port 310 may include a processor 312 and an interface 314. Processor 312 may include one or more processors, microprocessors, ASICs, FPGAs, static memory, dynamic memory, cache memory, and/or flash memory. Processor 312 may determine when traffic congestion exists, may modify drop thresholds for particular (e.g., critical) packets, may signal controller 240 to reroute particular LSPs to alleviate traffic congestion, and/or may transmit outgoing packets via interface 314. Interface 314 may include a physical interface to a network link. In one implementation, the physical interface may correspond to an optical interface, an Ethernet interface, or another type of network interface. In another implementation, interface 314 may include a logical interface. As described above, a logical interface may correspond to a single physical interface, a portion of a single physical interface, or a combination of multiple, physical interfaces.

Although FIG. 3 shows example components of output unit 220, in other implementations, output unit 220 may contain fewer components, different components, differently arranged components, or additional components than depicted in FIG. 3. In still other implementations, one or more components of output unit 220 may perform one or more other tasks described as being performed by one or more other components of output unit 220.

Figure 4:
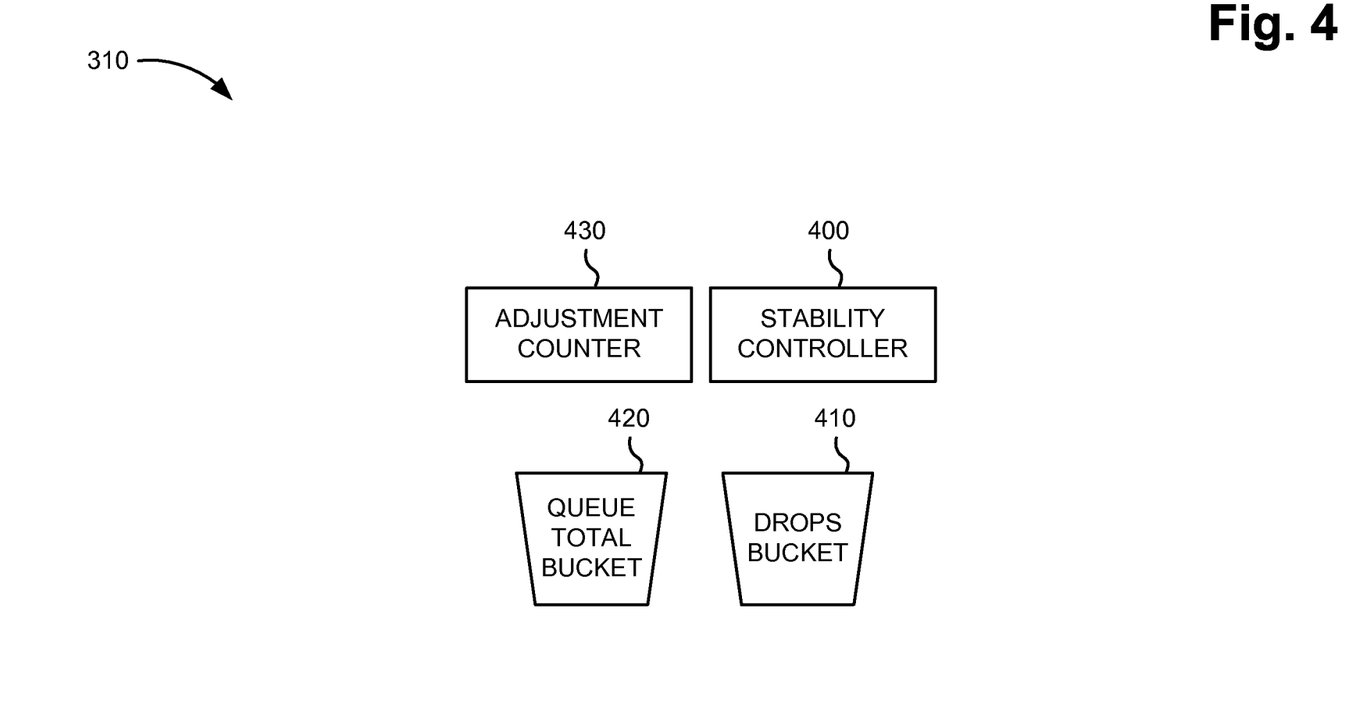
FIG. 4 is a block diagram of example functional components of an output port of FIG. 3.

FIG. 4 is a block diagram of example functional components of output port 310. In one implementation, the functions described in connection with FIG. 3 may be performed by processor 312 (FIG. 3). In another implementation, the functions described in connection with FIG. 3 may be performed by processor 312 in conjunction with interface 314. As illustrated, output port 310 may include a stability controller 400, a drops bucket 410, a queue total bucket 420, and an adjustment counter 430.

Stability controller 400 may include hardware or a combination of hardware and software to monitor traffic statistics for interface 314, determine if the interface is congested and/or is dropping packets (e.g., critical packets), and invoke corrective mechanisms if necessary. In one implementation, stability controller 400 may be included as a script within processor 312. As described further herein, stability controller 400 may monitor information from drops bucket 410, queue total bucket 420, and adjustment counter 430 to protect critical packets being sent via interface 314. In one implementation, stability controller 400 may communicate with controller 240 to facilitate mechanisms to alleviate traffic congestion, such as modification of drop thresholds for particular (e.g., critical) packets and/or rerouting of particular LSPs.

Drops bucket 410 may include hardware or a combination of hardware and software to count packets dropped by interface 314. Dropped packets may include, for example, critical packets, non-critical packets, or a mix of critical and non-critical packets. In one implementation, stability controller 400 may monitor drops bucket 410 to detect if critical packets (or a particular number of critical packets per time interval) are include in drops bucket 410.

Queue total bucket 420 may include hardware or a combination of hardware and software to count the total occupancies in queue 300. Queue total bucket 420 may include configurable thresholds that may be used (e.g., by stability controller 400) to limit the total buffer usage of interface 314. For example, when a fill level in queue total bucket 420 exceeds a maximum congestion threshold, stability controller 400 may invoke traffic control measures, such as signaling controller 240 to preempt a low-priority LSP from interface 314 to achieve the increased bandwidth reservation. Queue total bucket 420 is described further in connection with FIG. 5.

Adjustment counter 430 may include hardware or a combination of hardware and software to provide a counter value that indicates the number of times that stability controller 400 adjusts the drop precedence for critical packets. Stability controller 400 may, for example, employ a configurable number of attempts (e.g., four) to eliminate instances of dropped critical packets by adjusting the drop threshold parameters for the critical packets. When adjustment counter 430 reaches the configured limit, stability controller 400 may use another mechanism to eliminate instances of dropped critical packets.

In operation, interface 314 may receive both low-priority LSPs and high-priority LSPs. Generally, the low-priority LSPs may include non-critical packets; while the high-priority LSPs may include a mix of critical and non-critical packets. Stability controller 400 may force a re-route of (e.g., "preempt") one or more low-priority LSPs (e.g., carrying non-critical packets) if stability controller 400 determines that interface 314 is close to congestion (as indicated by the maximum congestion threshold of queue total bucket 420) but not yet dropping NC packets. This re-route may be achieved by modifying the routing rules for an active routing protocol of node 110, such as a constraint shortest path first (CSPF) protocol. If stability controller 400 determines it has dropped critical packets (e.g., based on an inspection of drops bucket 410), then stability controller 400 may change the drop threshold parameters for the critical packets, thus, giving preference to the critical packets over the non-critical packets. If interface 314 continues to drop critical packets (e.g., for successive corrective intervals, as measured by adjustment counter 430), then stability controller 400 may increase the bandwidth reservation for the high-priority LSP and force a re-route of the low-priority LSP (e.g., a LSP that has only non-critical packets). As a result, the low-priority LSP may route over a non-congested path, thereby, fully protecting the critical packets in the high-priority LSP.

Figure 5:
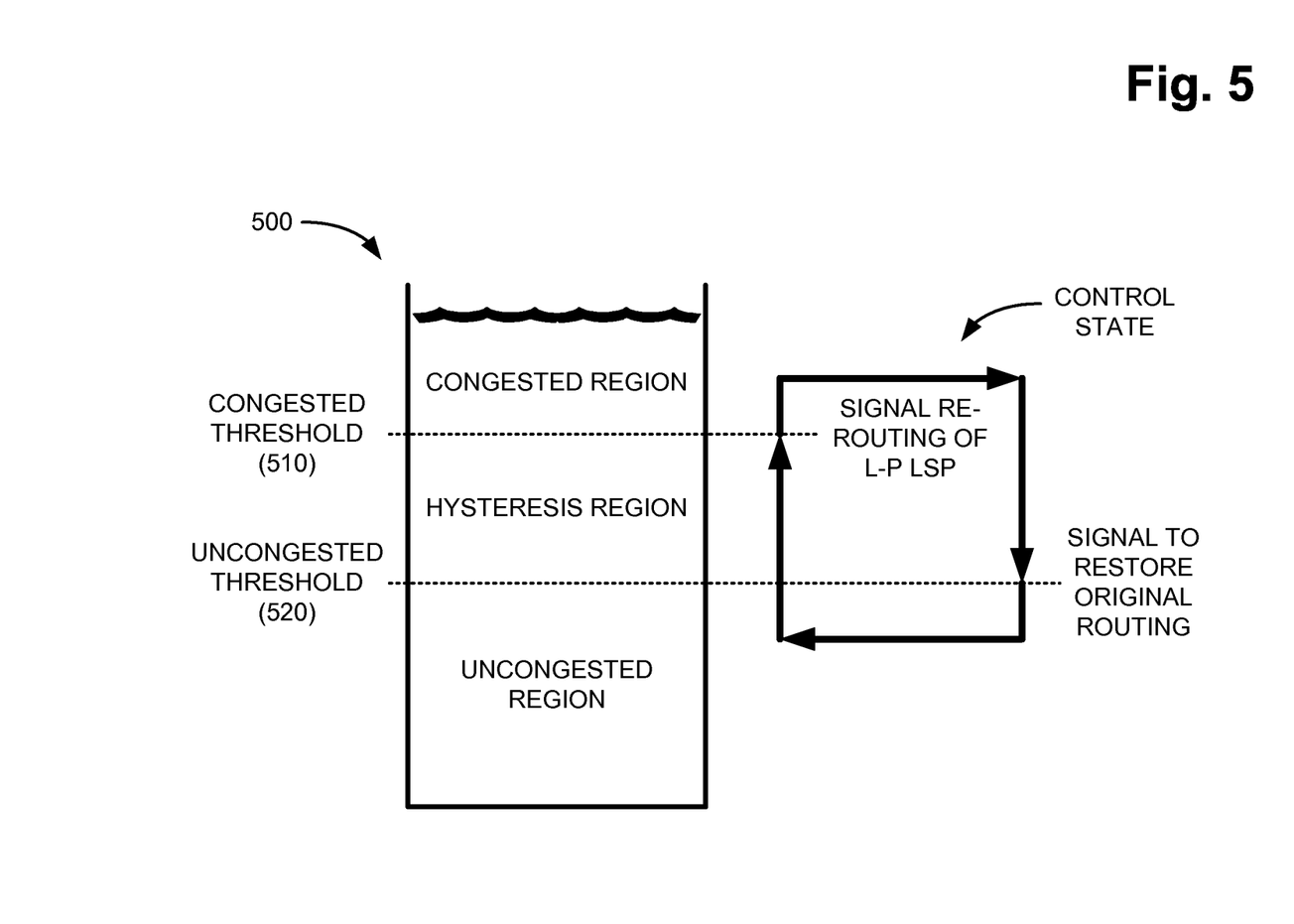
FIG. 5 is a diagram of example threshold operations for a queue total bucket of FIG. 4.

FIG. 5 provides a diagram 500 of example threshold operations for queue total bucket 420. Queue total bucket 420 may include a one or more counters and two flow-control thresholds (e.g., a congested threshold 510 and an uncongested threshold 520). As shown in FIG. 5, congested threshold 510 and uncongested threshold 520 may divide a fill-level of queue total bucket 420 into three regions, namely congested (e.g., buffer space almost full) region, a hysteresis region, and an uncongested (e.g., buffer space available) region.

In one implementation, levels for congested threshold 510 and uncongested threshold 520 may be configurable, and based on percentages of available buffer space for interface 314. Because implementations described herein may provide for efficient interface 314 use, a service provider can more fully utilize interface 314 without fear of affecting service to customers sharing the same interface. Thus, where conventional network practices may limit congestion levels to 50 percent, implementations described herein may set upper level thresholds at, for example, 60 to 90 percent of available buffer capacity of interface 314. For example, in one implementation, congested threshold 510 may be set to 80% of the available buffer capacity and uncongested threshold 520 may set to 50% of the available buffer capacity.

In case of congestion, as the fill-level of queue total bucket 420 exceeds congested threshold 510, stability controller 400 may assert traffic controls against (e.g., preempt) one or more low-priority LSPs currently using interface 314. When the fill-level of queue total bucket 420 drops below uncongested threshold 520, stability controller 400 may revoke policy changes (e.g., return to original drop threshold parameters for critical packets and original bandwidth reservation for the high-priority LSP) on the remaining LSPs associated with interface 314.

Each enqueue or dequeue event from queue 300 may cause updates to the bucket counter(s) of queue total bucket 420, causing stability controller 400 to check the current region/threshold for queue total bucket 420.

Figure 6:
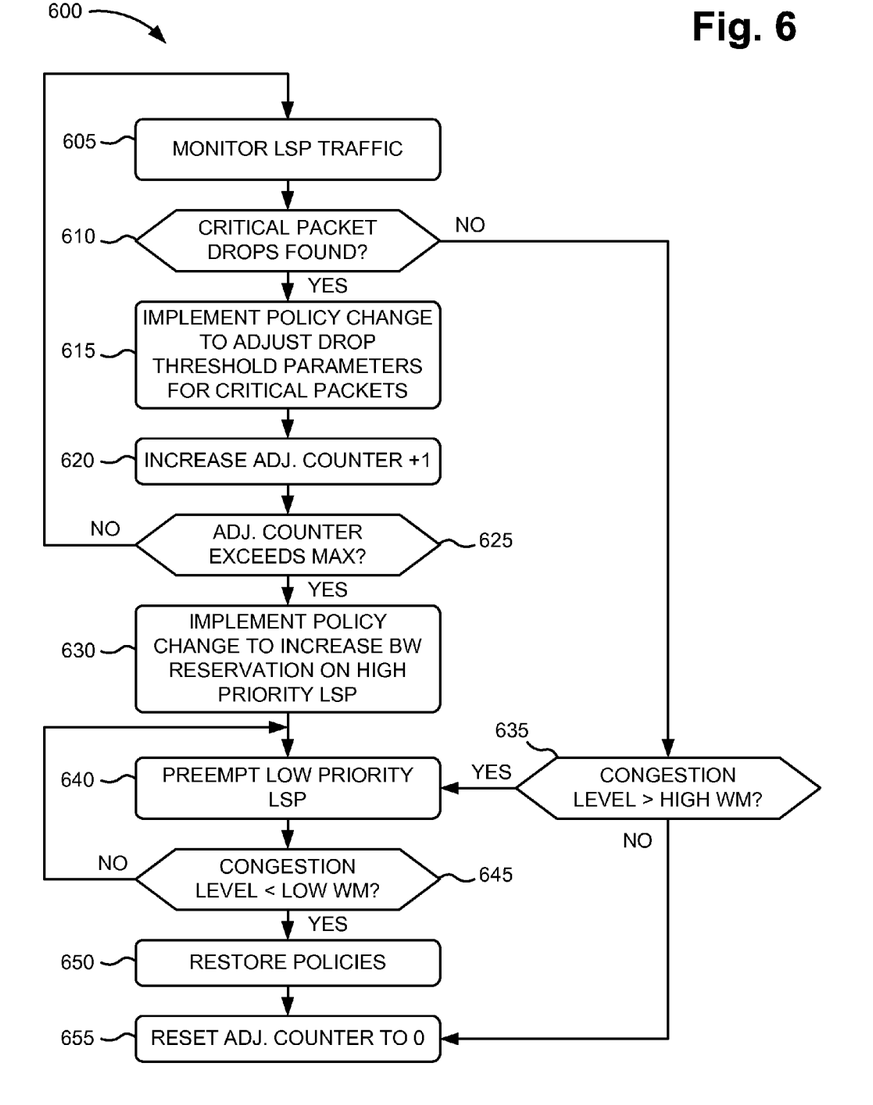
FIG. 6 is a flow chart of an example process for stabilizing traffic through a network node interface experiencing congestion, according to an implementation described herein.

FIG. 6 is a flow chart of an example process 600 for stabilizing traffic through a network node interface experiencing congestion according to implementations described herein. In one implementation, process 600 may be performed by node 110. In another implementation, some or all of process 600 may be performed by another device or group of devices, including or excluding node 110.

As shown in FIG. 6, process 600 may include monitoring LSP traffic (block 605), and determining whether there are any critical packet drops (block 610). For example, output port 310 (e.g., stability controller 400) may monitor a packet stream for dropped packets (e.g., in drops bucket 410) and congestions (e.g., based on queue total bucket 420). Stability controller 400 may check for critical packets in drops bucket 410 based on, for example, a type of service identified in the DSCP field of the IP header for each packet.

If there are critical packet drops (block 610—YES), a policy change may be implemented to adjust the drop threshold parameters for the critical packets (block 615), an adjustment counter may be increased (block 620), and it may be determined if the adjustment counter exceeds a maximum value (block 625). For example, if stability controller 400 identifies high-priority packets, such as NC packets, in drops bucket 410, stability controller 400 may adjust the drop threshold for the critical packets to assure delivery up to a higher traffic rate. The adjustment may incrementally increase the guaranteed traffic rate for the high-priority packets. When stability controller 400 causes an adjustment of the drop precedence, stability controller 400 may also increment adjustment counter 430. For example, stability controller 400 may increment counter 430 by one, up to a particular maximum value, each time stability controller 400 causes an adjustment of the drop precedence.

If the adjustment counter does not exceed the maximum value (block 625—NO), process 600 may return to process block 605 to monitor the LSP traffic. If the adjustment counter exceeds a maximum value (block 625—YES), a policy change may be implemented to increase the bandwidth (BW) reservation on the high-priority LSP (block 630). For example, stability controller 400 may continue to monitor drops bucket 410 after each adjustment to the drop precedence, may continue to cause adjustments to the drop precedence when critical packets are identified in drops buck 410, and may continue to increment adjustment counter 430, until adjustment counter 430 reaches a particular maximum count (e.g., 4). If adjustment counter 430 reaches the particular maximum count, stability controller 400 may implement (or cause another component, such as controller 240, to implement) an increase in reserved bandwidth for the high-priority LSP. In one implementation, stability controller 400 may initiate an existing adaptive bandwidth reservation (ABR) scheme.

Returning to block 610, if there are no critical packet drops (block 610—NO), it may be determined if a congestion level exceeds a high watermark ("WM") (block 635). For example, stability controller 400 may monitor queue total bucket 420 to identify congestion levels in interface 314. A maximum congestion threshold (e.g., congested threshold 510) may be defined, for example, based on a particular percent capacity (e.g., 80%) of available buffer capacity for an interface. A minimum congestion threshold (e.g., uncongested threshold 520) may be defined, for example, based on a particular lower percent capacity (e.g., 50%) of available buffer capacity.

When the bandwidth reservation is increased in block 630, or if the congestion level exceeds the high watermark (block 635—YES), a low-priority LSP may be preempted (block 640), and it may be determined if the congestion level is below a low watermark (block 645). For example, in conjunction with increasing the reserved bandwidth for the high-priority LSP, stability controller 400 may preempt a low-priority LSP from interface 314 to achieve the increased bandwidth reservation. Similarly, if congested threshold 510 of queue total bucket 420 is exceeded, stability controller 400 may preempt a low-priority LSP from interface 314 to achieve the increased bandwidth reservation. In one implementation, node 110 may invoke a CSPF mechanism to optimize routing for the preempted LSP by selecting a less congested route path.

If the congestion level is not below the low watermark (block 645—NO), process 600 may return to block 640 to preempt another low-priority LSP. If the congestion level is below a low watermark (block 645—YES), policies may be restored (block 650) and the adjustment counter may be reset to zero (block 655). For example, stability controller 400 may continue to monitor queue total bucket 420 after each preemption of a low-priority LSP and may preempt other low-priority LSPs (if possible) from interface 314 until uncongested threshold 520 of queue total bucket 420 is reached. Once uncongested threshold 520 of queue total bucket 420 is achieved, stability controller 400 may restore (or signal another component, such as controller 240, to restore) policies concerning the drop precedence and the reserved bandwidth for the high-priority LSP and may restore the low-priority LSP to the original path. Adjustment counter 430 may be reset to zero, and stability controller 400 may continue monitoring the LSP traffic.

Returning to block 635, if the congestion level does not exceed the high watermark (block 635—NO), the adjustment counter may also be reset to zero (block 655). For example, if stability controller 400 determines that the congestion level in queue total bucket 420 is less than the maximum congestion threshold (and, for example, previous policy changes to adjust the drop threshold successfully eliminated critical packet drops), stability controller 400 may reset adjustment counter 430 to zero and continue monitoring the LSP traffic.

Figure 7A:
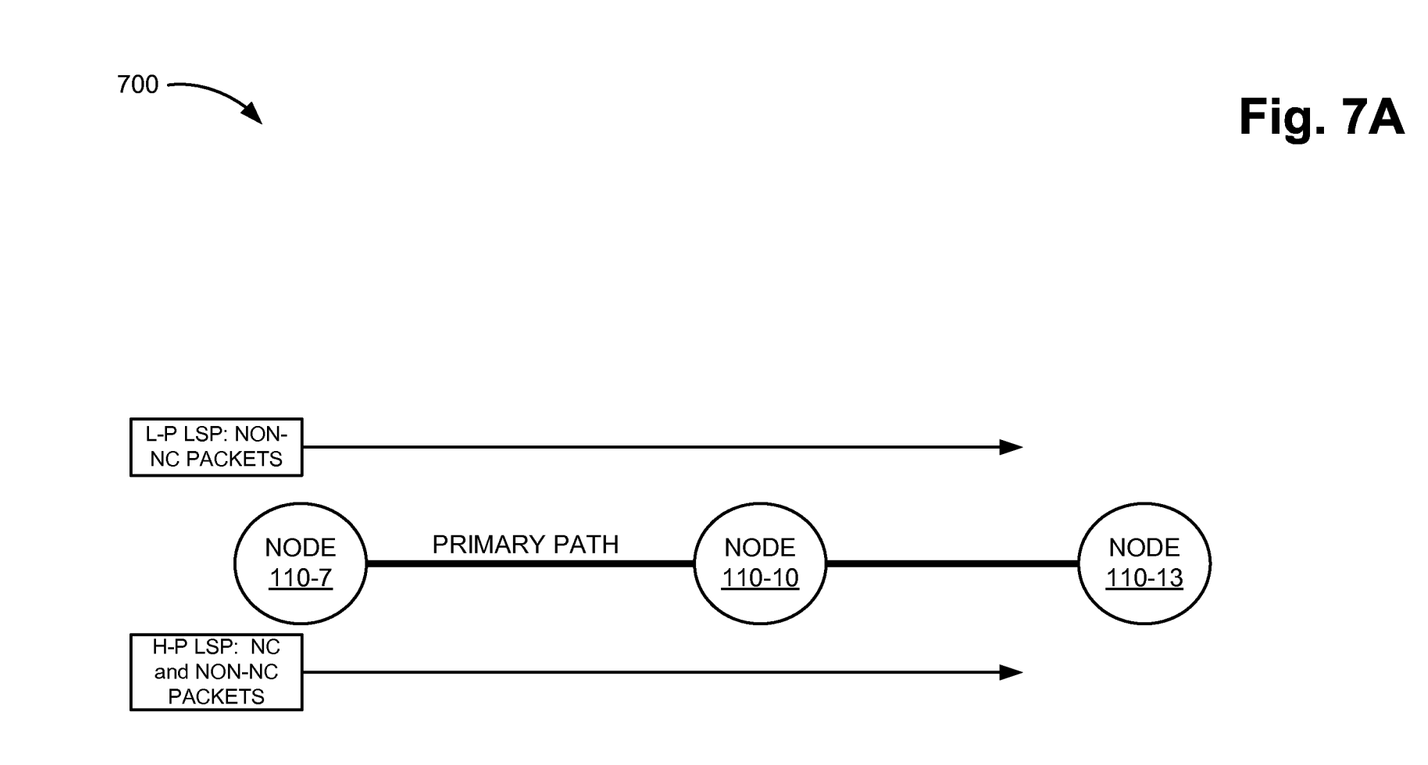
FIGS. 7A-7D are diagrams of an example for providing congestion control, according to an implementation described herein.

FIGS. 7A-7D are diagrams of an example of providing congestion control in a network, according to an implementation described herein. As shown in FIG. 7A, an intermediate node (e.g., one of nodes 110) may transmit packets, over an interface, via a high-priority (H-P) LSP and a low-priority (L-P) LSP. The high-priority LSP may include a mix of NC packets and non-NC packets. The low-priority LSP may include only non-NC packets. Under ideal conditions, as shown in FIG. 7A, assume traffic in the high-priority LSP and traffic in the low-priority LSP may travel from node 110-7 to node 110-13 via a primary path.

Figure 7B:
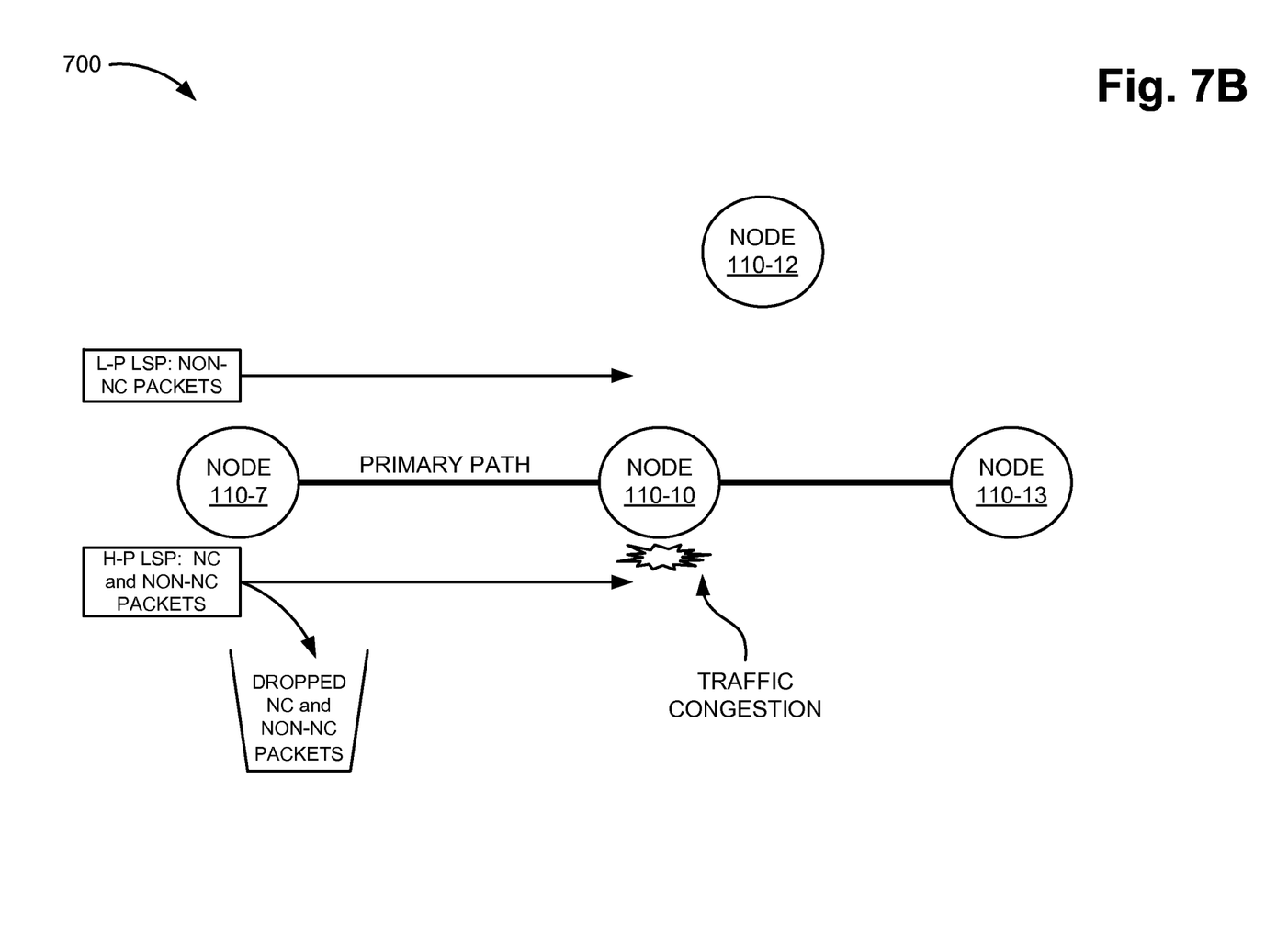

Referring to FIG. 7B, assume congestion at node 110-10 causes an output interface at node 110-7 to drop NC packets from the high-priority LSP (non-NC packets from the high-priority LSP and the low-priority LSP may also be dropped). According to an implementation described herein, node 110-7 may detect that NC packets have been dropped and apply an automatic network stabilization mechanism to prevent network instability due to the congestion and failed delivery of the NC packets. First, to increase passage of the NC packets, node 110-7 may implement a policy change to adjust the drop threshold for the NC packets. For example, node 110-7 may incrementally adjust the values in the DSCP field of the NC packets to give NC packets priority over other packets in the high-priority LSP. If, after a configurable maximum number of incremental DSCP value changes (e.g., as measured by an adjustment counter), node 110-7 continues to drop NC packets from the high-priority LSP, node 110-7 may evaluate the congestion level at the outgoing interface, increase the bandwidth reservation for the high-priority LSP, and preempt the low-priority LSP.

Figure 7C:
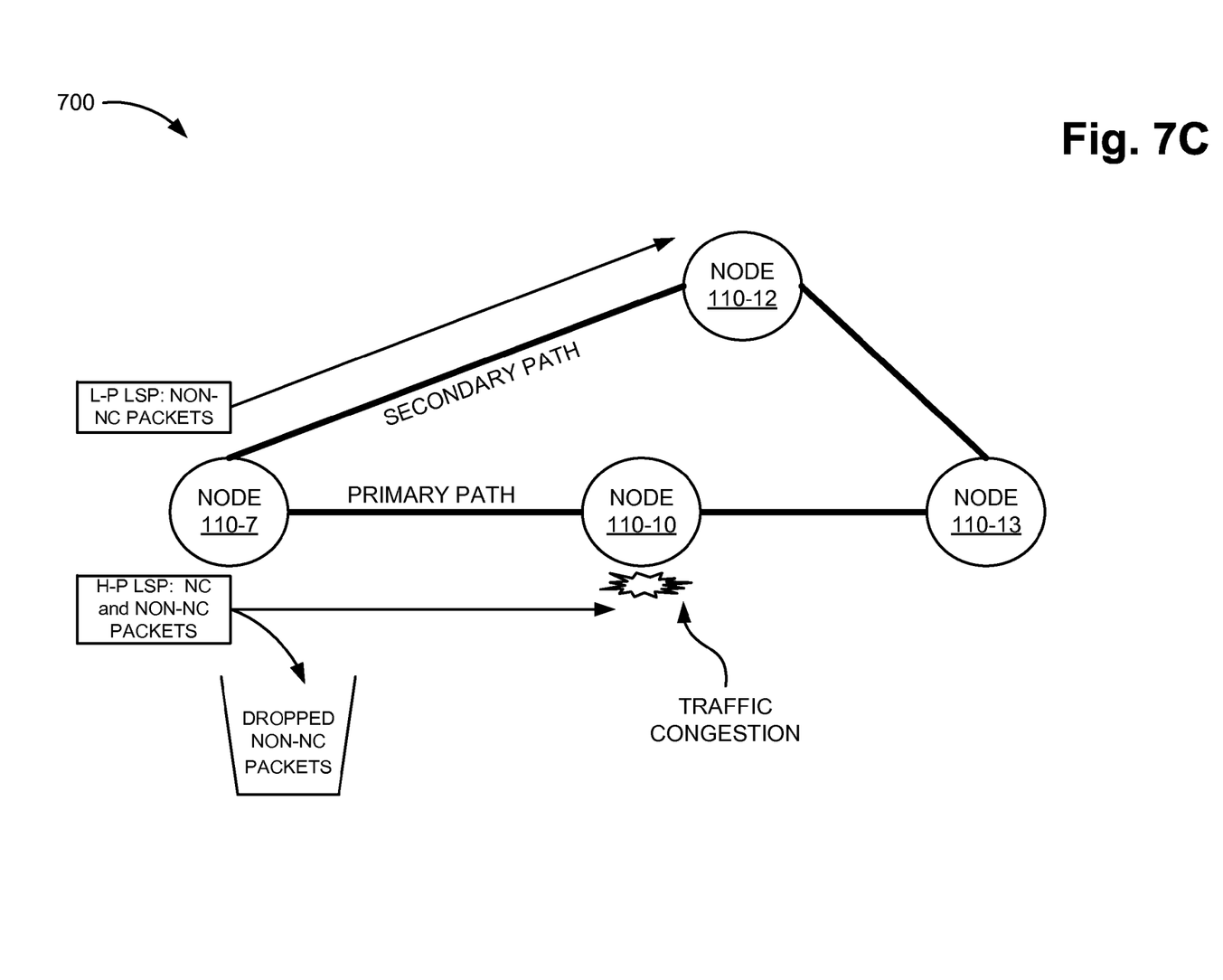

Referring to FIG. 7C, assume the congestion at node 110-10 does not cause the output interface at node 110-7 to drop NC packets from the high-priority LSP (although non-NC packets from the high-priority LSP and the low-priority LSP may be dropped), but raises the congestion level of the output interface above 80 percent (e.g., a congested threshold). According to an implementation described herein, node 110-7 may evaluate the congestion level at the output interface and, detecting high congestion, may preempt the low-priority LSP. Based on CSPF protocols, node 110-7 may re-route the low-priority LSP to a secondary path (e.g., via node 110-12).

Figure 7D:
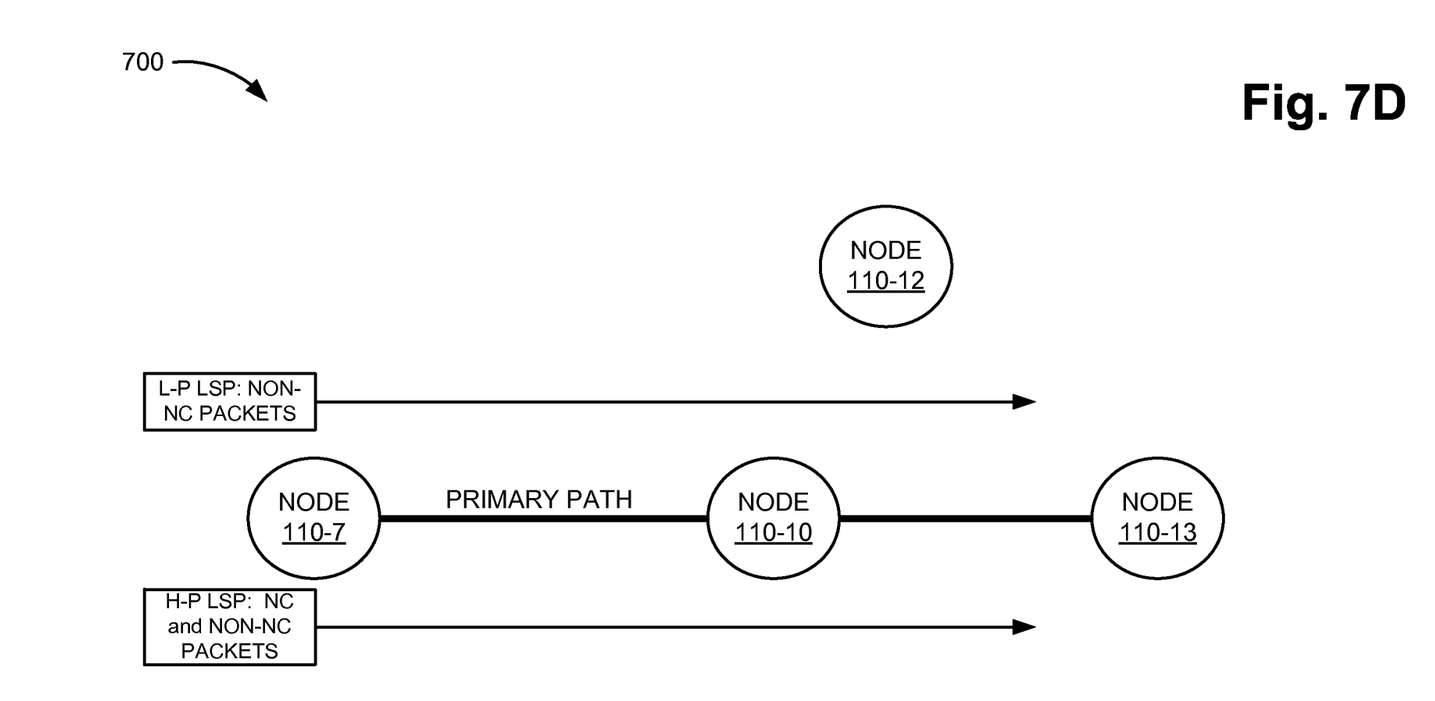

Referring to FIG. 7D, assume the congestion at node 110-10 dissipates and, accordingly, the monitored congestion levels at the output interface of node 110-7 decrease and eventually drop below 50 percent (e.g., an uncongested threshold). According to an implementation described herein, node 110-7 may restore any original policies that were previously altered (e.g., concerning the drop precedence and the reserved bandwidth for the high-priority LSP described in connection with FIG. 7B) and may reset the adjustment counter to zero. Traffic for the high-priority LSP may continue over the primary path, and traffic for the low-priority LSP may be re-routed from the secondary path back to the primary path.

Systems and/or methods described herein may monitor traffic associated with an interface of a network node. The traffic may include a high-priority LSP and a low-priority LSP. The systems and/or methods may detect one or more critical packets dropped at the interface and may adjust, based on the detecting, DiffServ drop threshold parameters, for the critical packets in the high-priority LSP, from an original threshold level to an adjusted level. If more critical packets dropped at the interface are detected after the adjusting, the systems and/or methods may increase a bandwidth reservation for the high-priority LSP and may preempt the low-priority LSP. If no more critical packets dropped at the interface are detected after the adjusting, the systems and/or methods may determine, by the network node, a congestion level at the interface and may preempt the low-priority LSP when the congestion level exceeds a congested threshold. The systems and/or methods may restore the low-priority LSP to the interface when, based on the monitoring, the interface has reached an uncongested threshold.

The systems and/or methods described herein may provide efficient use of the node interface that is being monitored. For example, efficiencies may be realized when a network is designed so that various customers share the same NNI under an assumption that not all customers are using this interface at the same time. Using the systems and/or methods described herein, a service provider can fully utilize the interface without fear of affecting the customer's service. Thus, instead of limiting the NNI congestion to, for example, 50 percent, a service provider could now allow a higher congestion level. The interface may become more cost efficient to the service provider because the NNIs are more fully utilized, and, therefore, service providers would require fewer NNIs (e.g., less equipment to buy and/or maintain).

Although portions of the forgoing description have been described in the context of network control packets as having highest priority, in other implementations, systems and/or methods described herein may be applied to any packet that can be classified and forwarded using, for example, a DSCP value. Thus, systems and/or methods described herein can be applied to other types of traffic, such as voice (e.g., voice over Internet Protocol (VoIP)) traffic, video traffic, etc.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components or logic may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or critical to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   monitoring, by a network node, traffic through a queue associated with an output port of the network node,
      wherein the traffic through the queue includes packets for a high-priority label switched path (LSP) that includes a mix of critical and non-critical packets and packets for a low-priority LSP that includes only non-critical packets, and
      wherein the monitoring includes monitoring buffer capacity levels in the queue and monitoring for dropped packets;
   detecting, by the network node and based on the monitoring for dropped packets, one or more critical packets from a group of critical and non-critical packets that are dropped at the queue;
   adjusting, by the network node and based on the detecting the one or more critical packets, differentiated services (DiffServ) drop threshold parameters of the queue, for the critical packets in the high-priority LSP, from an original threshold level to an adjusted level;
   increasing, by the network node and when more critical packets dropped at the queue are detected after the adjusting, a bandwidth reservation for the high-priority LSP;
   detecting, by the network node and based on the monitoring the buffer capacity levels, a congestion level above a congested threshold; and
   preempting, by the network node and based on the detecting the congestion level or increasing the bandwidth reservation, the low-priority LSP from the queue.

2. The method of claim 1, further comprising:
   determining that the congestion level at the output port has decreased below an uncongested threshold;
   restoring the DiffServ drop threshold to the original threshold level; and
   restoring the low-priority LSP.

3. The method of claim 1, wherein adjusting the DiffServ drop threshold parameters comprises:
   increasing the drop threshold for up to a preconfigured number of iterations,
   incrementing an adjustment counter after each iteration of the preconfigured number of iterations, and
   monitoring a drops bucket of the queue for dropped critical packets after each iteration of the preconfigured number of iterations.

4. The method of claim 1, where the critical packets are classified and forwarded based on a particular Differentiated Services Code Point (DSCP) value in an Internet protocol (IP) header of each of the critical packets.

5. The method of claim 4, where the critical packets are network control (NC) packets.

6. The method of claim 1, where preempting the low-priority LSP includes:
   re-routing the low-priority LSP based on a modification of constraint shortest path first (CSPF) routing rules.

7. The method of claim 1, wherein the congested threshold is about 60% to about 90% of an available buffer capacity of the queue.

8. The method of claim 1, wherein the one or more critical packets dropped at the queue are dropped based on queue management using weighted random early detection (WRED).

9. A network device, comprising:
   a memory including buffer space for an output queue associated with an interface of the network device, wherein the output queue includes packets for a high-priority label switched path (LSP) that includes a mix of critical and non-critical packets and packets for a low-priority LSP that includes only non-critical packets; and
   a controller to:
      monitor for dropped packets from the output queue;
      monitor buffer capacity levels in the output queue;
      detect, based on monitoring the dropped packets, one or more critical packets from a group of critical and non-critical packets that are dropped from the output queue;
      adjust, based on the detecting, differentiated services (DiffServ) drop threshold parameters, for the critical packets in the high-priority LSP, from an original threshold level to an adjusted level;
      increase, when more critical packets dropped at the interface are detected after the adjusting, a bandwidth reservation for the high-priority LSP and preempt the low-priority LSP; and
      determine, when no more critical packets dropped at the interface are detected after the adjusting, a congestion level at the interface and preempt the low-priority LSP when the congestion level exceeds a congested threshold.

10. The network device of claim 9, where the controller is further to:
    determine that a congestion level at the interface has decreased below an uncongested threshold;
    restore the DiffServ drop threshold to the original threshold level; and
    restore the low-priority LSP to the interface.

11. The network device of claim 9, where, when adjusting the DiffServ drop threshold parameters, the controller is further to:
    increase the drop threshold for up to a preconfigured number of iterations,
    increment an adjustment counter after each iteration of the preconfigured number of iterations, and
    monitor a drops bucket for dropped critical packets after each iteration of the preconfigured number of iterations.

12. The network device of claim 9, where the critical packets are classified and forwarded based on a particular differentiated services code point (DSCP) value in an Internet protocol (IP) header of each of the critical packets.

13. The network device of claim 9, where the critical packets are:
    network control (NC) packets,
    video content packets, or
    voice over Internet Protocol (VoIP) packets.

14. The network device of claim 9, where, when preempting the low-priority LSP, the controller is further to:
    re-route the low-priority LSP over a secondary path based on a modification of constraint shortest path first (CSPF) routing rules.

15. The network device of claim 9, where the congested threshold is at least 80 percent of available capacity of the buffer space for the one or more output queues associated with the interface of the network device.

16. A method performed by a network device, the method comprising:
    monitoring, by the network device, packet drops from an outgoing queue for a network-to-network interface of the network device, wherein the outgoing queue for the network-to-network interface includes a high-priority label switched path (LSP) that includes a mix of network control packets and non-network control (NC) packets;
    determining, by the network device and based on the monitoring of the packet drops, that the outgoing queue for the network-to-network interface has dropped one or more network control packets from the outgoing queue;
    incrementally adjusting, by the network device and based on the determining, a drop threshold parameter in the outgoing queue, for the network control packets, to give preference to the network control packets over non-NC packets within the outgoing queue;
    monitoring, by the network device and after the adjusting, buffer capacity levels for traffic over the network-to-network interface;
    preempting, by the network device and based on the monitoring of the buffer capacity levels, a low-priority LSP using the outgoing queue for the network-to-network interface when the network device determines that the outgoing queue for the network-to-network interface has exceeded a congested threshold, wherein the uncongested threshold is a configurable percentage of a total available buffer capacity for the network-to-network interface; and
    restoring, by the network device, the low-priority LSP to the network-to-network interface when the network device determines that the network-to-network interface has reached an uncongested threshold, wherein the uncongested threshold is another configurable percentage of the total available buffer capacity for the network-to-network interface.

17. The method of claim 16, wherein the network control packets are classified and forwarded based on a particular Differentiated Services Code Point (DSCP) value in an Internet protocol (IP) header of each of the network control packets.

18. The method of claim 16, where preempting the low-priority LSP includes:
    re-routing the low-priority LSP based on a modification of constraint shortest path first (CSPF) routing rules.

19. The method of claim 16, further comprising:
    increasing a bandwidth reservation for the high-priority LSP when the network device determines that the outgoing queue for the network-to-network interface has dropped the one or more other network control packets.

20. The method of claim 16, wherein incrementally adjusting a drop threshold parameter includes:
    adjusting the drop threshold for up to a preconfigured number of iterations,
    incrementing an adjustment counter after each iteration of the preconfigured number of iterations, and
    stopping the adjusting when:
       the counter reflects the preconfigured number of iterations, or the network device determines that the outgoing queue for the network-to-network interface has not dropped other network control packets within a particular period.

* * * * *